Dec. 23, 1941. D. H. FINKLE 2,267,328
CLAMP
Filed April 18, 1941
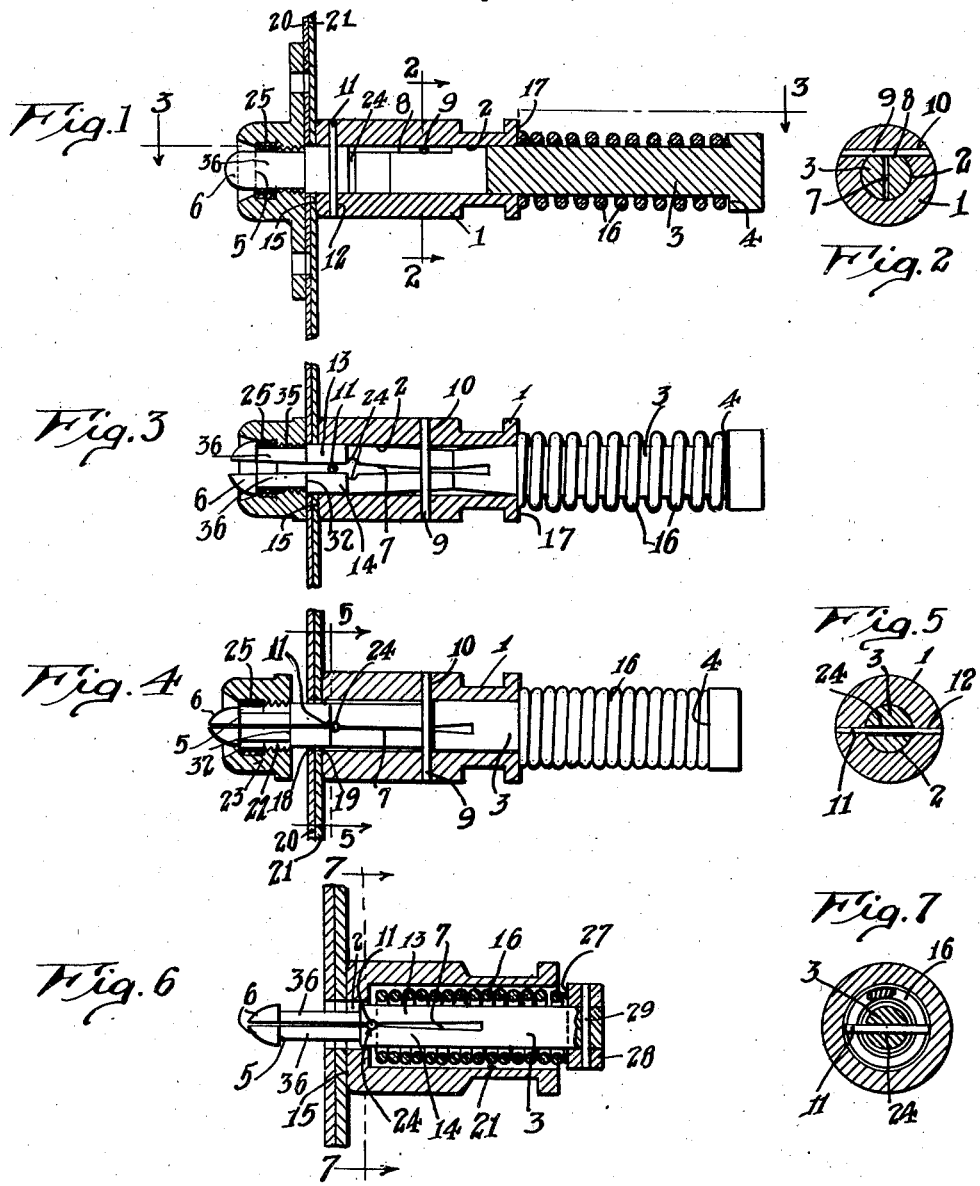
Inventor
Donald H. Finkle
By Lyon & Lyon
Attorneys Patented Dec. 23, 1941

2,267,328

UNITED STATES PATENT OFFICE 2,267,328

CLAMP

Donald H. Finkle, Los Angeles, Calif.

Application April 18, 1941, Serial No. 389,151

1 Claim. (Cl. 85—5)

My invention relates to a clamp for use in concentrically aligning holes in two or more parts.

In the construction of an airplane, inspection plates are attached to the external surface which, upon removal, give access to the motor, control apparatus, etc. These inspection plates are mounted by means of bolts which align with a "stop nut" riveted to the main covering surface or skin of the airplane. As there are several bolts and "stop nuts" used in fastening the inspection plates, it is necessary that the bolt holes in the inspection plate, in the skin and the "stop nuts" all concentrically align. These "stop nuts" are riveted to the inside of the skin and must be held in concentric alignment with the skin and inspection plate holes while the rivet holes are drilled and the rivets fastened in place.

As a "stop nut" has threads for engaging the bolts holding the inspection plates, the diameter of the hole in the "stop nut" necessarily is smaller than the clearance holes in the inspection plates and the skin. All of the present clamps for aligning holes are usable only where the holes to be aligned have the same diameters. By the use of my clamp hereafter described I am able to concentrically align holes of different diameter.

My invention is also usable where the task is the alignment of similar diameter holes and is successful in holding the skin to the structural members and at the same time concentrically aligning the rivet holes while the remainder of the rivet holes are drilled and the rivet fastened.

It is, therefore, an object of my invention to provide a clamp for concentrically aligning holes.

Another object of my invention is to provide a clamp for concentrically aligning holes of different diameters.

Another object of my invention is to provide a clamp which is cheaply manufactured and easily assembled.

Another object of my invention is to provide a clamp that is nearly foolproof in operation, easily used, and not subject to breakage.

Other objects and advantages of my invention will be apparent from the following description of the preferred embodiments thereof.

In the drawing:

Fig. 1 is a section;

Fig. 2 is a section taken on the lines 2—2 of Fig. 1;

Fig. 3 is a section substantially taken on the line 3—3 of Fig. 1;

Fig. 4 is a similar view to Figure 3, partially in section, with the clamp expanded;

Fig. 5 is a section taken on the line 5—5 of Fig. 4;

Fig. 6 is a section showing a modification;

Fig. 7 is a section taken on the line 7—7 of Fig. 6.

A clamp constructed in accordance with my invention has a body member 1 having a hole 2 therethrough for the reception of the split pin 3. The pin 3 is machined from ordinary steel rod and is provided at one end with a shoulder 4 and at the other end with a shoulder 5. The end 6 of the pin 3 is rounded off to aid insertion of this end through the holes to be aligned. The pin 3 has a slot 7 made by either milling or grinding, forming extensions 13 and 14.

To retain the pin 3 in the body member 1, the pin 3 is flatted on one side at 8 and a small rod 9 is positioned in the hole 10 in body member 1 adjacent to the flatted side 8. The rod 9 may be riveted in place.

To spread the two extensions 13 and 14 of the pin 3, I place a small rod 11 through a hole 12 in the body member 1 and into the slot 7. As this rod 11 is larger in diameter than the slot 7, the extensions 13 and 14 are spread so that the total diameter of the extensions 13 and 14 is the size of the hole 2 and the shoulder 5 extends beyond the hole 2 and material can be clamped between the shoulder 5 and the face 15 of the body member 1.

I provide a spring 16 positioned between the shoulder 4 and the end 17 of the body member 1 to exert a tension between the face 15 and the shoulder 5 to firmly clamp any material placed therebetween.

To permit the extensions 13 and 14 to spring back to their normal diameter, I drill a hole 24 of sufficient diameter to allow the rod 11 to fit loosely therein in the pin 3 so positioned that when the clamp is completely compressed as shown in Fig. 4 the rod 11 will pass therethrough and the extensions 13 and 14 will spring together and decrease their combined diameters and allow insertion of the end 6 in the holes 18 and 19 in the skin 20 and inspection plate 21, respectively, and through the hole 22 of the stop nut 23.

The usual stop nut 23 has a central hole 22 which has threads 35 and a fibre bushing 25 threaded similarly to threads 35. The holes 18 and 19 are clearance size for the bolts which engage the threads 35. The diameters of the holes 18 and 19 are larger than the hole 22 and to concentrically align these three holes the pin 3 is made of such size that when the extensions 13 and 14 are expanded by the rod 11 the extensions 13 and 14 are a tight fit in the holes 18 and 19. A neck 36 on the extensions 13 and 14 is made the same length as the hole 22 and has a total diameter, when expanded, substantially that of the hole 22.

The total diameter of the shoulder 5 is larger than the diameter of the hole 22 when the extensions 13 and 14 are expanded by the rod 11. The shoulder 5 engages the bushing 25 and clamps the stop nut 23, the skin 20, and the inspection plate 21 against the face 15 by means of the tension exerted on the shoulder 4 by the spring 16. In this position the neck 36 tightly fits in the hole 22 and the extensions 13 and 14 tightly fit the holes 18 and 19 and align all three holes 22, 18 and 19.

A modification of my invention is shown in Fig. 6 and enables me to make a slightly cheaper construction with equal advantages to the one previously described. The flatted side 8, the rod 9 and the hole 10 may be deleted by enlarging the hole 2 as at 21 in the body member 1.

In this last type of construction the rod 11 needs only to be slightly larger than the normal hole 2 and the hole 12 may be dispensed with. In this type of construction the spring 16 has one end engaging the rod 11 and the other end engaging the shoulder 4 or the face 27 of a cap which is the modification to be described.

To assemble this type of clamp, the spring 16 is placed on the pin 3, the rod 11 is placed through the hole 24 and the pin forced through the hole 2.

Once this type of clamp is assembled, it will not come apart because the shoulder 5 when the extensions 13 and 14 are expanded is larger than the hole 2 through the face of the body member 1 and the spring 16 will force the rod 11 against the inner side of the body member 1 at all times and will cause the rod 11 to slide into the milled slot 7 and expand the extensions 13 and 14. Only when the spring 16 is completely compressed, as shown in Fig. 6, will the rod 11 lie in the hole 24 and permit the shoulder 5 to be inserted in the holes to be aligned.

It will be noted that when the clamp of my invention is to be used to align ordinary rivet holes between two sheets of material, the size of the holes to be aligned will be that of the neck 36 when expanded and when a "stop nut" is not to be aligned the full sized portions of the extensions 13 and 14 will not extend beyond the face 15.

The modification shown in Fig. 6 is particularly adapted for the ordinary riveting of skin to structural members as the neck 36 extends well into the body member 1 at all times. This is the preferred type on ordinary rivet work as the shoulder 32, occasioned by the neck 36, sometimes interferes in the insertion of the clamp into comparatively long holes.

In Fig. 6 I have shown a cap rather than a simple shoulder. This cap comprises a simple bushing 28 held to the end of pin 3 by a pin 29 passing through holes in both bushing 28 and pin 3. The face 27 of the bushing takes the place of the shoulder 4.

While I have described the preferred embodiments of my invention, I am not limited to the specific forms described therein except as set forth in the appended claim.

I claim:

In a clamp of the class described, a body member, a pin extending from said body member formed with a slot extending longitudinally from one end thereof, a projection upon the slotted end of said pin, said projection being insertable through the holes to be aligned, means for expanding said pin whereby said projection will engage one side of the sheets to be clamped, tension means whereby said sheets are clamped between said body member and said projection, and a neck and a shoulder on said pin whereby said pin aligns holes of different diameters.

DONALD H. FINKLE.